United States Patent  [19]

Nördstrom et al.

[11] 3,747,715
[45] July 24, 1973

[54] WEIGHING DEVICE
[75] Inventors: Kjeli Hlege Nördstrom; Rune Nils Allan Flinth, both of Vasteras, Sweden
[73] Assignee: Transrail AB, Vasteras, Sweden
[22] Filed: Sept. 16, 1971
[21] Appl. No.: 180,993

[30] Foreign Application Priority Data
Sept. 21, 1970 Sweden .............................. 12805/70

[52] U.S. Cl. ................................. 177/134, 177/163
[51] Int. Cl. ...................... G01g 19/02, G01g 21/22
[58] Field of Search .................... 177/134, 135, 163, 177/211

[56] References Cited
UNITED STATES PATENTS
3,366,189 1/1968 Bellier ............................ 177/211 X
3,085,642 4/1963 Raskin ............................... 177/134
3,213,953 10/1965 Flinth ............................. 177/211 X
3,347,326 10/1967 Raskin ............................... 177/163

*Primary Examiner*—George H. Miller, Jr.
*Attorney*—Yount & Tarolli

[57] ABSTRACT

A device for static or dynamic weighing of railway guided vehicles comprising a foundation, vehicle engaging rails forming a weigh platform adapted to engage and support the wheels of the vehicle and friction free elastic joints interconnecting the weigh rails to the foundation thereby to eliminate open joints between the ground rails and the weigh device without affecting the accuracy of the weigh device.

7 Claims, 10 Drawing Figures

PATENTED JUL 24 1973 3,747,715

WEIGHING DEVICE

This invention relates to weighing devices and, more particularly, to a device for static or dynamic weighing of railway guided vehicles.

It is well known that weighing of railway guided vehicles can be accomplished by means of stationary platform scales which are arranged in weighing pits in the path of the vehicle. One example of such a scale is disclosed in a pamphlet published by Toledo Scale Corporation, Toledo, Ohio, and entitled "Toledo Steel Master Levers." Typical of such arrangements is the provision on the upper surface of the platform of a rail of some kind, as for example, a channel beam for a vehicle having rubber wheels or a rail in the case of railway cars. In either instance, the wheel engaging surface of the rail carried by the platform is in the same plane as the corresponding surface on the fixed ground supported rails adjacent to the scale but the platform rails are disconnected from the ground supported rails by an open joint at either end so that the rail section carried by the platform scale is free to move vertically. In such arrangements, the load resting on the scale may be sensed by various means such as, for example, a mechanical weighing system or by the use of load cells.

Systems of the above-described type are not suitable for use in a railway system where the railway cars must be allowed to pass the scale at full speed when the cars are not to be weighed. The reason for this is the substantial wear which would occur at the joint between the weigh platform and the adjoining ground supported rails as well as the damaging stresses which would be imposed on the weighing system by the rapidly moving cars.

Various attempts have been made to devise weighing systems which will overcome these as well as other problems. For example, it is known to utilize a membrane or flexure member at the joint between the weigh rail and the ground supported rail. This technique is disclosed, for instance, in British Pat. Nos. 832,389, 820,969 and 797,161. A similar arrangement is also disclosed in Swedish Pat. No. 217,810 and U.S. Pat. No. 3,213,953. The membranes used in such devices can either be made sufficiently strong so they can carry the load from a passing vehicle without suffering plastic deformation or, alternatively, they can be made relatively weak and used in combination with supporting or limiting means which support the membranes as the wheel passes thereover. In this latter arrangement, the membranes must be made so thin that the stresses arising at the ends of the membranes during deflection do not cause permanent yield in the membrane which would affect the system accuracy. On the other hand, the membranes must be sufficiently strong that they can directly carry the wheel the distance necessary before the membrane is supported.

The arrangements using relatively weak, supported membranes employ a small slot or space between the membrane and the support with the membrane being deflected downward into engagement with the support as the wheel passes thereover. The magnitude of the space between the membrane and the support is limited to a minimum of about 50 microns in certain points since it is necessary to prestress the membranes and such a prestress typically corresponds to a deflection of about 50 microns. In addition, manufacturing tolerances on the order of 20 microns must be accommodated.

In practice, the use of very thin membranes is entirely unworkable since the membranes must be able to accommodate side forces from the wheels and also longitudinal forces such as, for example, those created by thermal expansion and braking forces.

The alternative employing a self-supporting relatively stiff membrane is equally unworkable where accurate weighing is desired since membrances having the required stiffness shunt approximately 50% of the load and can thus only be used for very rough indications of the vehicle weight. Moreover, such arrangements are particularly sensitive to temperature variations.

Another problem in using either very thin membranes or relatively stiff membranes is that, as the membranes wear, the accuracy of the system is adversely affected.

It is a principal object of this invention to provide a weighing system for railway guided vehicles which overcome the foregoing problems, as well as others, encountered with the prior art systems and which is capable of weighing vehicles either statically or dynamically with a high degree of accuracy.

This object, as well as others, is achieved in the present invention by a weigh device comprising weigh rails supported by load cells on a foundation with flexure joints at either end of the weigh rails and connecting the weigh rails to the foundation. The flexure joints each comprise relatively rigid rail sections having an elastic joint at either end thereof with the relatively rigid rail sections providing adequate support for the wheels of the vehicle and the elastic joints being of such a small dimension that the bending stresses arising when the wheels pass are minimized while providing a design which is very weak in the vertical direction.

Other aspects and features of the invention will be more apparent from the following description which, together with the attached drawings, discloses but certain preferred forms of the invention.

Referring now to the drawings wherein like reference numerals indicate like parts in the various views.

Figure 1:
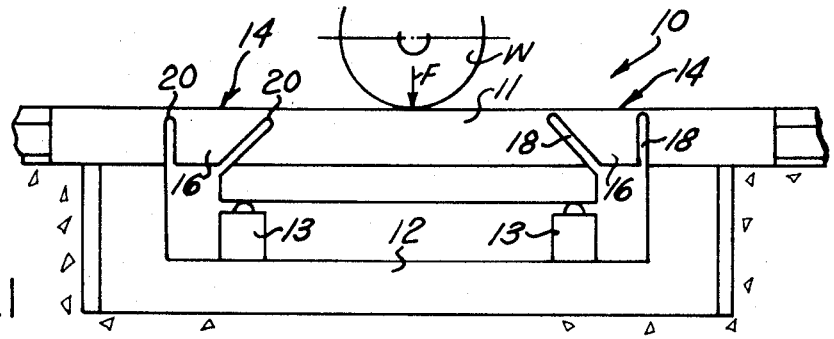
FIG. 1 is a longitudinal section of a weigh device constructed in accordance with the principles of this invention.

Referring now more in detail to the drawings, there is illustrated in FIG. 1 a weigh device, indicated generally by the reference numeral 10, constructed in accordance with the principles of this invention. The weigh device 10 comprises a vehicle supporting part comprising a weigh rail 11 and a foundation part 12. The weigh rail 11 extends across the weigh device and is supported on the foundation 12 by suitable load sensing means which, as illustrated in FIG. 1, comprise a pair of compression sensing load cells 13. The vehicle supporting weigh rail 11 is supported at either end on the foundation 12 and abuts the conventional ground supported rails to provide a continuous path along which the vehicle wheel W passes. To permit vertical movement of the operative portion of the weigh rail under loading of wheel W, flexure joints, indicated generally by the reference numeral 14, are provided. These flexure joints are identical and it will be understood that the description of one such joint applies equally to the other.

The flexure joint 14 comprises a relatively rigid transition rail section 16 which is formed by the slots shown at 18 to provide weakened elastic joints 20 on either side of section 16. However, as is apparent from FIG. 1, the slots 18 do not extend through the rail so that a smooth continuous wheel engaging surface free of open gaps or joints extends entirely across the weigh device 10.

Figure 5:
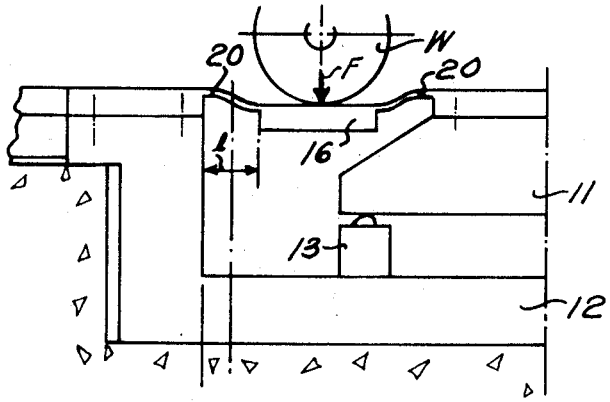
FIG. 5 is a partial longitudinal section of a device constructed according to the principles of the invention and illustrating the operation of the device as a vehicle wheel passes on to the weigh device.
Figure 5A:
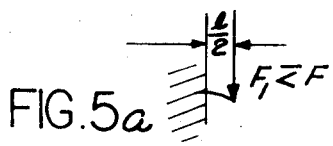
FIG. 5(a) is a schematic illustration of the forces acting on the flexure joint as the wheel passes thereover.
Figure 6:
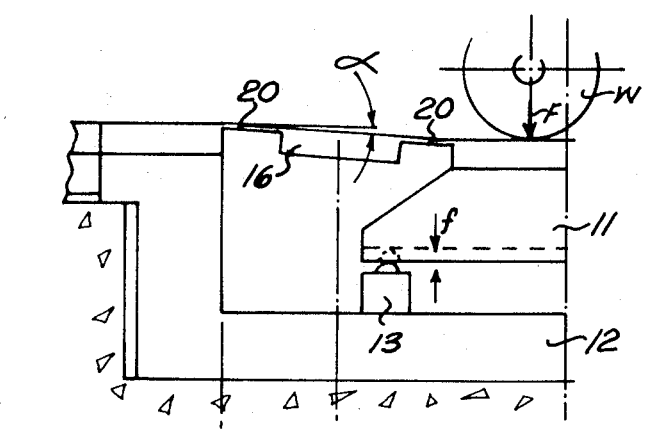
FIG. 6 is a view similar to FIG. 5 showing the wheel positioned on the weigh rail.
Figure 6A:
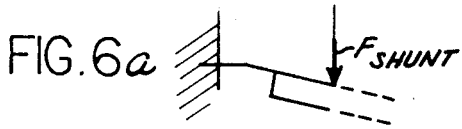
FIG. 6(a) is a schematic illustration of the forces acting on the flexure joint with the wheel positioned as shown in FIG. 6.

FIGS. 5 and 6 illustrate, on a greatly magnified scale, the function of the flexure joints 14 as a vehicle wheel passes on to the weigh device. As shown in FIG. 5, the wheel 10 is positioned over the rigid rail section 16. Because of the rigidity of the rail section 16, it is capable of supporting the point loading F from the wheel W. However, the relatively weak elastic joints 20 interconnecting the transition rail to the weigh rail 11 and the foundation 12, readily deflect in a vertical direction under the load. The width "l" of the slots 18 is relatively small so that, in spite of the thinness of joints 20, excessive bending stresses at these joints is avoided. It will be understood that the cross-sectional area of the joints 20 must be sufficiently large to withstand the shear stresses caused by the forces F from the wheel W.

In FIG. 6 the wheel W has progressed on to the weigh rail 11 and substantially all the load is now being carried by the load cells 13 which produce a signal proportional to the force F. Only an insignificant portion of the force F is shunted to the foundation part 12 since the elastic joints 20 offer very little bending resistance and since the distance "f" through which the load cells are compressed is very small so that the angle $\alpha$ formed between the transition rail 16 and the horizontal is correspondingly small.

Figure 2:
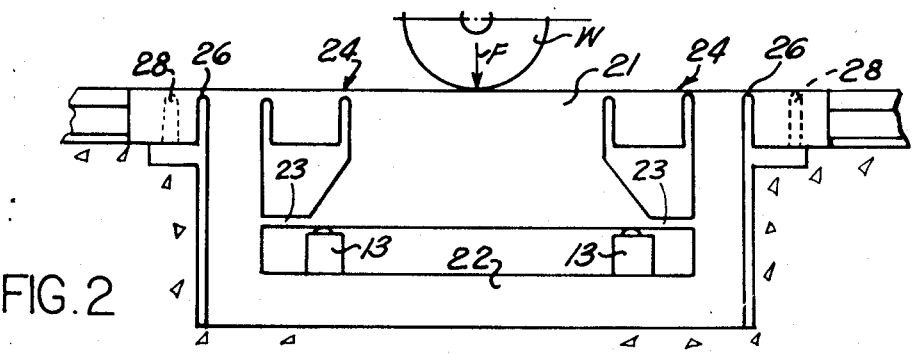
FIG. 2 is a longitudinal section of an alternative form of the weigh device.

FIG. 2 illustrates a modified form of the weigh device wherein a vehicle supporting weigh rail 21 is formed as a unitary part of foundation support 22 with flexure joints 24, which are similar in construction and function to the flexure joints 14 of the embodiment of FIG. 1, being employed. In addition, a pair of horizontally disposed membranes or tiebars 23 connect the lower portion of the vehicle supporting weigh rail 21 adjacent the load cells 13 to the foundation 22. The membranes 23 are relatively rigid in the horizontal plane but weak vertically so that the membranes provide a means for guiding the movement of the weigh rail 21 in the vertical direction and thereby protect the load cells from horizontal side forces.

In addition, the embodiment of FIG. 2 illustrates a technique for preventing external bending moments such as those which may arise from the vehicle wheels on either side of the weigh device from affecting the weigh device. This is accomplished through the use of elastic joints 26 formed by a reduced cross-section adjacent the outside of the foundation 22. Still further, the effect of vertical forces from the rails external to the weighing device can be eliminated by the use of additional elastic joints indicated at 28 which are spaced from the elastic joints 26. It will be noted that each of the joints 26 and 28 is similar in that it provides a continuous or uninterrupted surface along which the wheel W may pass while, at the same time, providing a relatively weak section in a vertical direction which is effective to isolate the weigh device from unwanted forces.

Figure 3:
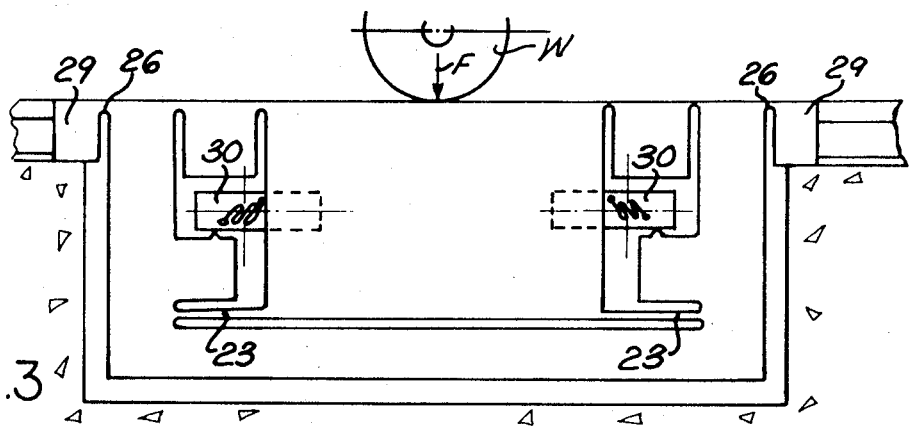
FIG. 3 is a longitudinal section of a further modified form of the weigh device.

FIG. 3 illustrates an arrangement similar to that of FIG. 2 but in which the elastic joints 28 have been eliminated by firmly supporting the rail section 29 immediately adjacent the elastic joint 26 in the manner illustrated in that Figure. In addition, the compression type load cells 13 have been replaced by load cells 30 which are of the shear stress sensing type of a bending stressed beam design.

Figure 4:
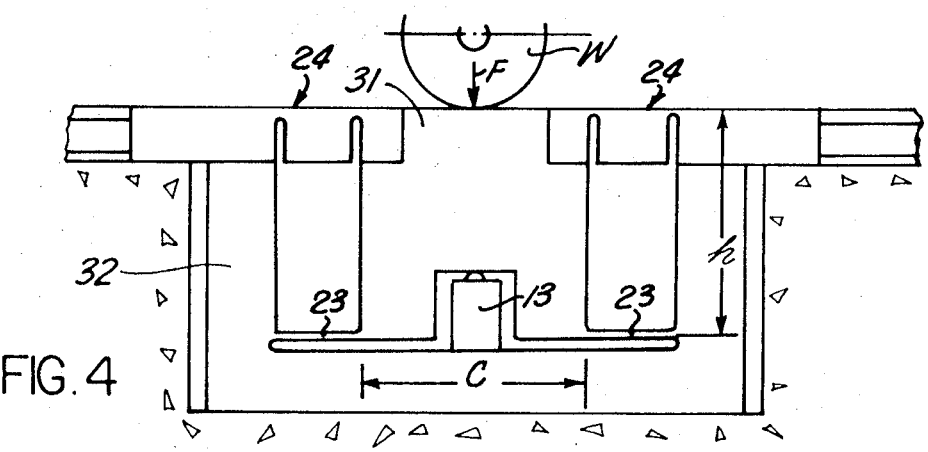
FIG. 4 is a longitudinal section of a further modified form of the weigh device.

In FIG. 4 a further modified form of the weigh device is illustrated with a single load cell 13 of the compression type being located centrally of the weigh device. As in the embodiment of FIG. 2, flexure joints 24 and guiding membranes 23 connect the vehicle supporting weigh rail 31 to the foundation 32. For optimum guiding, the vertical distance "h" between the wheel engaging surface of the rail and the membrane 23 should be substantially greater than the distance "c" between the membranes 23. In other words, the quotient $h/c$ should be as large as possible.

Figure 7:
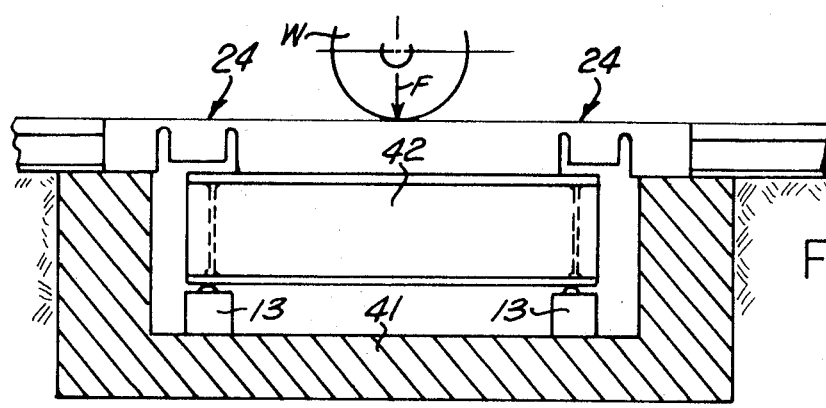
FIG. 7 is a longitudinal section illustrating the invention applied to a conventional weighing platform.

Turning now to FIG. 7, there is illustrated a conventional weigh bridge comprising a steel or concrete foundation 41 with the vehicle supporting part or platform 42 consisting of a steel or concrete structure supported by load cells 13. In accordance with this invention, the vehicle supporting rails on the weigh platform 42 are formed with flexure joints 24 having the same general configuration and function as the flexure joints of FIG. 2. These flexure joints also serve as a guiding means in the horizontal direction for the vehicle supporting part 42 relative to the load cells and the foundation 41 so that conventional guiding means such as tiebars, membranes or the like can be eliminated.

Figure 8:
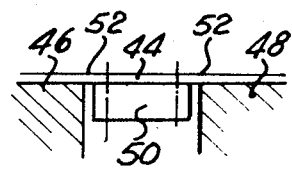
FIG. 8 illustrates a modified form of a flexure joint.

FIG. 8 illustrates a modified form of the flexure joints. As shown in that Figure, the slotted reduced cross-section formed in the rails has been eliminated and a vehicle supporting member 44 having a substantially constant cross-section extends between the foundation 46 and the vehicle supporting part 48. A reinforcing member 50 having substantial rigidity is secured to the undersurface of the member 44 and provides a central region having substantial rigidity in the vertical direction but which is spaced from the foundation 46 and the vehicle supporting part 48 to provide, in effect, a slotted construction which provides elastic joints at 52 for the purposes hereinbefore described.

It is contemplated that the described weighing devices normally will be used with both rails in a rail system so that, although a single weigh device associated with a single wheel has been illustrated, it will be appreciated that a second weigh device of the same construction would be used with the other wheel on the axle. It is, of course, possible to utilize only a single weigh device associated with only one of the rails but, because the lateral load distribution in the vehicles is normally not known, the use of a single weigh device will result in reduced measuring accuracy.

While the foregoing weigh devices have been described and illustrated as being formed of a plurality of separate parts, it will be appreciated that the device according to the invention can be made as a unitary construction, or alternatively, be further subdivided. Accordingly, while the principles of the invention have been described with reference to certain specific embodiments, neither the illustrated embodiments nor the terminology employed in describing them is intended to be limiting; rather, it is intended to be limited only by the scope of the appended claims.

What is claimed is:

1. A weighing device for weighing railway guided vehicles or the like comprising:
   longitudinally extending vehicle supporting means adapted to engage and support at least one wheel of a vehicle for passage across the weigh device, said vehicle supporting means including an uninterrupted wheel engaging surface extending across the weigh device,
   foundation means supporting said vehicle supporting means at either end thereof,
   load sensing means operatively associated with a portion of said vehicle supporting means for sensing a load applied to said portion,
   said vehicle supporting means including flexure joint means between said foundation support and said portion,
   said flexure joint means comprising a relatively rigid section with bendable elastic joints on either side thereof whereby,
   said flexure joint means are operative to permit vertical movement of said portion of said vehicle supporting means substantially independently of said foundation supported ends thereof.

2. The weigh device of claim 1 and further including membrane means interconnecting said vehicle supporting means and said foundation means,
   said membrane means being spaced from the wheel engaging surface of said vehicle supporting means and having substantial rigidity in a horizontal direction but weak in a vertical direction.

3. The weigh device of claim 1 wherein said load sensing means comprises shear stress sensing load cells.

4. The weigh device of claim 1 wherein the longitudinal ends of said vehicle supporting means extend beyond said foundation means and include elastic joint means for insulating the weigh device from the influence of external force.

5. The weigh device of claim 4 wherein said vehicle supporting means and said foundation means are formed as an integral unit.

6. In a railway system having a pair of rails for supporting railway cars for movement therealong, a weigh device for weighing railway cars, said weigh device including:
   a longitudinally extending weigh rail coextensive with one of said rails in said system and including a substantially uninterrupted wheel engaging surface,
   means supporting said weigh rail at either end thereof,
   spaced apart flexure joints formed in said weigh rail and defining a weigh portion therebetween, said weigh portion being movable vertically relative to the supported ends thereof,
   each of said flexure joints comprising a pair of spaced apart narrow slots formed in said weigh rail and a substantially rigid longitudinal segment between the two slots of each pair of slots, and
   load sensing means disassociated from direct contact with said rigid segments and operatively associated with said weigh portion for producing a signal when said weigh portion moves vertically under a load.

7. A longitudinally extending weigh rail for use in weighing railway guided vehicles or the like, said weigh rail having a generally uninterrupted wheel engaging surface extending along the length thereof and two pairs of spaced apart areas of substantially reduced cross section extending transversely of said weigh rail with each of said pairs of areas defining a deflectable friction free joint, a central weigh portion between said joints, each joint including a substantially rigid longitudinal segment between the two areas of the joint's pair, said segments being disassociated from the central weigh portion of said rail except through one of said areas of each of said pairs, whereby said portion of said weigh rail between said pairs is deflectable relative to the ends of said weigh rail.

* * * * *